United States Patent [19]
Koenraadt et al.

[11] Patent Number: 6,100,349
[45] Date of Patent: Aug. 8, 2000

[54] THERMOSETTING POWDER COATING COMPOSITION

[75] Inventors: Martinus Adrianus Anthonius Maria Koenraadt, Duiven; Arie Noomen, Voorhout; Keimpe Jan Van Den Berg, Sassenheim; Huig Klinkenberg, Katwijk aan Zee, all of Netherlands; Klaus Hobel, Erlenbach, Germany

[73] Assignee: Akzo Nobel N.V., Arnhem, Netherlands

[21] Appl. No.: 09/108,397

[22] Filed: Jul. 1, 1998

Related U.S. Application Data

[63] Continuation of application No. PCT/EP96/05737, Dec. 12, 1996.

[30] Foreign Application Priority Data

Jan. 2, 1996 [NL] Netherlands ............................ 1002008

[51] Int. Cl.$^7$ .................................................. C08G 59/40
[52] U.S. Cl. ......................... 525/528; 525/934; 525/438; 525/553; 525/526; 525/524; 427/386; 427/195
[58] Field of Search ..................................... 525/934, 528, 525/438, 533, 526, 524; 427/195, 386

[56] References Cited

U.S. PATENT DOCUMENTS

| | | | |
|---|---|---|---|
| 2,915,529 | 12/1959 | Bell et al. | 260/340.2 |
| 4,543,376 | 9/1985 | Schupp et al. | 523/414 |
| 4,772,666 | 9/1988 | Just et al. | 525/185 |
| 4,806,611 | 2/1989 | Honel et al. | 528/45 |
| 4,837,271 | 6/1989 | Brindopke | 525/330.3 |
| 4,859,788 | 8/1989 | Brindopke et al. | 558/398 |
| 5,039,336 | 8/1991 | Feuling | 75/419 |
| 5,091,475 | 2/1992 | Potter et al. | 525/124 |
| 5,091,492 | 2/1992 | Ishidoya et al. | 526/282 |
| 5,292,833 | 3/1994 | Grahe et al. | 525/531 |
| 5,393,855 | 2/1995 | Iwamura et al. | 526/269 |
| 5,409,771 | 4/1995 | Dahnmen et al. | 428/327 |

FOREIGN PATENT DOCUMENTS

| | | |
|---|---|---|
| 4129752 | 11/1993 | Germany. |
| 4161465 | 4/1992 | Japan. |

OTHER PUBLICATIONS

Rokicki et al., "Epoxy Resin Modified by Apliphatic Cyclic Carbonates", *Journal of Applied Polymer Science*, (1990), vol. 41, pp. 647–659.

Kihara et al., "Incorporation of Carbon Dioxide into Poly(g-lycidyl methacrylate)", *Macromolecules*, (1992), vol. 25, pp. 4824–4825.

*Primary Examiner*—Margaret G. Moore
*Attorney, Agent, or Firm*—Dilworth & Barrese

[57] ABSTRACT

Proposed is a thermosetting powder coating composition comprising a mixture of particles reactive towards one another and a catalyst, with a portion of the reactive particles comprising a polymer reacting with epoxy to form ester forming or ether forming groups, while another portion comprises an at least bifunctional cross-linking agent which contains 2-oxo-1,3-dioxolan-4-yl groups, hereinafter referred to as cyclocarbonate groups, and, optionally, epoxy groups, with both the polymer reacting with epoxy to form ester forming and/or ether forming groups and the cross-linking agent being obtained by means of a non-vinylic addition and/or polymerization process. The catalyst used as ring opener for the cyclocarbonate groups is present in a quantity of 0.01 to 10, preferably 0.1 to 5, parts by weight per 100 parts by weight of the mixture of particles reactive towards one another. The quantity of epoxy oxygen present in the cross-linking agent after $CO_2$ unblocking preferably is at least 0.4 wt. %. The reactive polymer preferably is a polymer containing groups reactive towards epoxy such as carboxyl, anhydride and/or hydroxyl groups, with preference being given to polyesters and/or polyurethanes.

17 Claims, No Drawings

THERMOSETTING POWDER COATING COMPOSITION

This is a con of PCT/EP96/05737 filed Dec. 12, 1996.

The invention pertains to a thermosetting powder coating composition comprising a mixture of particles reactive towards one another and a catalyst, with a portion of the reactive particles comprising a polymer reacting with epoxy to form ester forming and/or ether forming groups, while another portion comprises an at least bifunctional cross-linking agent which contains 2-oxo-1,3-dioxolan4yl groups, hereinafter referred to as cyclocarbonate groups, and, optionally, epoxy groups. Powder coatings having the aforementioned composition are known from JP-A-04161 465. The cross-linking agents used in the known powder coatings are derived from low-molecular weight vinyl polymers is having 2-oxo-1,3-dioxolan4-yl groups covalently bonded thereto. The polymer comprising epoxy to form ester forming and/or ether forming groups likewise preferably is a vinyl copolymer containing carboxyl and/or acid anhydride groups.

Although the known vinyl (co)polymers will give coatings with a high resistance after curing to attack by acids such as those present in acid rain, the thus obtained coatings have the drawback of a clearly reduced impact strength.

A further drawback to the cross-linking agents disclosed in said Japanese patent specification is their comparatively wide functionality distribution, resulting in a widely varying number of 2-oxo-1,3-dioxolan-4-yl groups per molecule. Besides molecules which contain two or more 2-oxo-1,3-dioxolan4-yl groups, there are molecules which contain no or only one 2-oxo-1,3-dioxolan-4-yl group. Vinyl polymers without 2-oxo-1,3-dioxolan-4-yl groups or with only one functional group will have an adverse effect on the quality of the coating.

The known powder coatings also have the drawback that the presence of mainly vinyl polymers, such-as polyacrylates, may give rise to compatibility problems with powder coatings based on non-vinylic polymers, such as the well-known powder coatings based on polyester with an epoxy resin such as triglycidyl isocyanurate as cross-linking agent. While these known, non-vinylic polymers generally produce impact resistant coatings, they have the drawback that for their cross-linking agent almost exclusively use is made of epoxy resins. For it has been found that the use of epoxy resins, the category to which the frequently employed triglycidyl isocyanurate (TGIC) belongs, is toxicologically suspect. There is a further drawback in that only a minute portion of the commercially available epoxy compounds qualify for use in powder coatings, more specifically those in the solid form. However, most epoxy compounds are liquid and give insufficient powder storage stability for the envisaged use.

The invention now provides a thermosetting powder coating composition which after application onto a substrate and curing results in coatings of high impact strength, which contain a cross-linking agent exhibiting no, or hardly any, toxicity or mutagenicity, sand in addition do not give any storage problems.

The invention consists in that in a thermosetting powder coating composition of the known type mentioned in the opening paragraph both the polymer reacting with epoxy to form ester forming and/or ether forming groups and the cross-linking agent were obtained by means of a non-vinylic addition and/or polymerisation process.

As a rule, satisfactory results are obtained when the cross-linking agent has a functionality of 2 or higher, with preference being given to a functionality in the range of 2 to 5.

The structural formula of 2-oxo-1,3-dioxolan4-yl groups can be represented as follows:

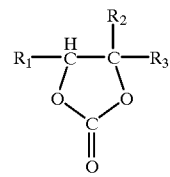

wherein $R_1$ has the meaning of a hydrogen atom, a linear or branched, unsubstituted or urethane group-, ether group- or ester group substituted aliphatic, aromatic, araliphatic or cycloaliphatic hydrocarbon group or heterocyclic group having 1 to 25 carbon atoms, and $R_2$ and $R_3$ may be the same or different and represent a hydrogen atom or an is alkyl group having 1 to 4 carbon atoms.

To obtain a satisfactory coating the powder coating compositions according to the invention have to incorporate a catalyst. The quantity of catalyst to be incorporated usually is at least 0.01 and not more than 10 wt. %, calculated on the mixture of particles reactive towards one another. When less than 0.01 part by weight of catalyst is employed per 100 parts by weight (pbw) of the mixture, unblocking takes place at such a high temperature that the released epoxy groups will react with the reactive groups in the polymer almost immediately, creating the potential risk that the formed $CO_2$ will be able to escape only in part and the formed coating will have a wrinkled surface. Employing more than 10 pbw of catalyst may mean sacrificing the storage stability of the powder coating. Moreover, such a large quantity of catalyst may affect the final quality of the coating. It has been found that, in general, optimum results are obtained when the catalyst used as ring opener for the cyclocarbonate group is present in an amount of 0.1 to 5 pbw per 100 pbw of the mixture of particles reactive towards one another.

Examples of suitable catalysts for the decarboxylation reaction are acid catalysts such as phosphonic acid, p-toluene sulphonic acid, and dimethyl sulphonic acid, and carbonates such as calcium carbonate and the like. However, preference is, given to the use of ammonium salts and/or phosphonium salts. As examples may be mentioned quaternary ammonium salts, such as tetramethyl ammonium bromide, trimethyl benzyl ammonium hydroxides 2-hydroxypyridine, trimethyl benzyl ammonium methoxide, phenyl trimethyl ammonium chloride, phenyl trimethyl ammonium bromide, phenyl trimethyl ammonium hydroxide, phenyl trimethyl ammonium iodide, phenyl trimethyl ammonium tribromide, the sodium salt of phosphocholine chloride, stearyl ammonium bromide, tetra-n-amyl ammonium iodide, tetra-n-butyl ammonium bromide, tetra-n-butyl ammonium hydroxide, tetra-n-butyl ammonium phosphate, tetra-n-decyl ammonium trichloride, tetraethyl ammonium hydroxide, tetraethyl ammonium tetrafluoroborate, acetyl choline bromide, alkyl dimethyl benzyl ammonium chloride, benzyl choline bromide, benzyl-n-butyl ammonium bromide, bis-(tetra-n-butylammanium)dichromate, and trimethyl vinyl ammonium bromide; phosphonium salts, such as allyl triphenyl phosphonium chloride, benzyl triphenyl phosphonium chloride, bromomethyl triphenyl phosphonium bromide, 2-dimethyl aminoethyl triphenyl phosphonium bromide, ethoxycarbonyl phosphonium bromide, n-heptyl triphenyl phosphdonium bromide, methyl triphenyl phosphonium bromide, lo tetrakis(hydroxymethyl)phosphonium sulphate, and tetraphenyl phosphonium bromide.

In the present powder coating compositions the cyclocarbonate groups always have the form of $CO_2$ blocked (latent) epoxy groups. Hence, after curing the same end groups are formed as would be obtained if only epoxy groups-containing cross-linking agents were employed. The use of epoxy groups-containing cross-linking agents in powder coatings is commonly known. The coatings obtained in this manner generally have excellent properties. Although in the now proposed coating compositions $CO_2$ is released as the cyclocarbonate groups decompose, unlike in the case of powder coatings with blocked isocyanates as cross-linking agent there is no contribution to the VOC (volatile organic compounds).

Cross-linking agents of which the functional groups are composed almost exclusively of cyclocarbonate groups generally are higher melting than cross-linking agents of comparable composition where the functional groups are composed almost exclusively of epoxy groups. In a number of cases this opens up the possibility of affecting physical properties, such as the melting point, by using a cross-linking agent which has experienced only partial replacement of the epoxy groups by cyclocarbonate groups or vice versa. In that case a single compound may contain cyclocarbonate groups as well as epoxy groups. To obtain the effect of significant melting point increase at least 10% of the functional groups in the cross-linking agent should be made up of cyclocarbonate groups. The remainder will then be made up of unblocked epoxy groups. Alternatively, a mixture of two cross-linking agents can be employed, with the functional groups in one compound being made up almost exclusively of cyclocarbonate groups, while in the other compound the functional groups are made up almost exclusively of epoxy groups. It has been found that, in general, optimum results are obtained when at least 50% of the functional groups takes the form of cyclocarbonate groups and the remaining groups are epoxy groups.

The quantity of cross-linking agent, calculated on the combination of polymer reactive toward epoxy groups and cross-linking agent, as a rule will not exceed 50 wt. %. The minimum amount to be incorporated usually is above 5 wt. %, with preference being given to a quantity in the range of 10 to 30 wt. %.

The amount of epoxy oxygen in the cross-linking agent after $CO_2$ unblocking generally corresponds to a quantity of at least 0.4 wt. %, with preference being given to an amount of epoxy oxygen of more than 1 wt. %. Optimum results are commonly obtained when using more than 2 wt. % of epoxy oxygen in the cross-linking agent. As a rule, the amount of epoxy oxygen will not exceed 20 wt. %.

The preparation of cyclocarbonate groups-containing cross-linking agents is commonly known. For instance, in DE-C41 29 752 a process is described for converting epoxy groups into a polyepoxide with the aid of a low-molecular weight 2-oxo-1,3-dioxolane in the presence of a basic catalyst at a temperature in the range of 55° to 170° C. and with a molar ratio of epoxide to dioxolane in the range of 10:1 to 1:20. In a different method, such as described by Rokicki et al. in *J. of Appl. Pol. Sci.* 41 (1990), 647–659, use is made of an epoxy compound which in the presence of 1,4,7,10, 13,16-hexabxacyclooctadecane (18-crown6-ether) and potassium iodide is converted into the corresponding cyclocarbonate with $CO_2$ at a pressure of about 30 atm.

Finally, reference may be had to a process such as disclosed by Kihara et al. in *Macromolecules* 25 (1992),. 4824–4825, where the epoxy compound is converted with $CO_2$ at atmospheric pressure in the presence of sodium iodide and, optionally, triphenyl phosphine as catalyst.

Another attractive preparative process consists in that use is made of a low-molecular weight hydroxyfunctional cyclocarbonate and an at least difunctional compound containing groups reactive towards hydroxyl groups. Several at least difunctional compounds qualify for entering into a reaction with the hydroxyfunctional cyclocarbonate. For instance, the hydroxyfunctional cyclocarbonate can be condensed with a dibromo alkane or a dichloro alkane to form a dicyclocarbonate suitable for direct use as a cross-linking agent. Nucleophilic replacement of an allyl halide or a vinylbenzyl halide by condensation with a hydroxyfunctional cyclocarbonate results in cyclocarbonates containing ethylenically unsaturated groups. Further condensation of these two key compounds with a silane having Si—H bonds results in silicon-containing (multifunctional) cyclocarbonate monomers. However, preference is given to a powder coating composition in which a portion of the reactive particles is obtained by reacting a hydroxyfunctional cyclocarbonate with a polyisocyanate. Thus glycerol carbonate can be obtained by reacting glycerol with ethylene carbonate, as described in U.S. Pat. No. 2,915,529.

The molecular weight (Mn) of the cyclocarbonate groups-containing cross-linking agent is in the range of 200 to 7000, preferably in the range of 300 to 2000. Low-molecular weight cross-linking agents are obtained by reacting a hydroxycyclocarbonate with aliphatic, cycloaliphatic, and/ or aromatic di-, tri- or tetraisocyanates which may be ethylenically unsaturated or not, such as 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, 2,4,4-trimethyl hexamethylene diisocyanate, dodecamethylene diisocyanate, ω, ω-dipropyl ether diisocyanate, 1,3-cyclopentane diisocyanate, 1,2-cyclohexane diisocyanate, 1,4,-cyclohexane diisocyanate, isophorone diisocyanate, 4-methyl-1,3-diisocyanatocyclohexane, trans-vinylidene diisocyanate, dicyclohexylmethane4,4'-diisocyanate, 3,3'-dimethyl-dicyclohexyl-methane-4,4'-diisocyanate, a toluene diisocyanate, 1,3-bis(isocyanatomethyl)benzene, a xylene diisocyanate, 1,5-dimethyl-2,4-bis(isocyanatomethyl) benzene, 1,5-dimethyl-2,4-bis(2-isocyanatoethyl)benzene, 1,3,5-triethyl-2,4-bis(isocyanatomethyl)benzene, 4,4'-diisocyanatodiphenyl, 3,3'-dichloro-4,4'-diisocyanatodiphenyl, 3,3'-diphenyl4,4'-diisocyanatodiphenyl, 3,3'-dimethoxy-4,4'-diisocyanatodiphenyl, 4,4'-diisocyanatodiphenyl methane, 3,3'-dimethyl-4,4'-diisocyanatodiphenyl methane, a diisocyanatonaphthalene, the adduct of 2 molecules of a diisocyanate, e.g., hexamethylene diisocyanate or isophorone dilsocyanate, to a diol such as ethylene glycol, the adduct of 3 molecules of hexamethylene diisocyanate to 1 molecule of water (available from Bayer under the trademark Desmodur N), the adduct of 1 molecule of trimethylol propane to 3 molecules of toluene diisocyanate (available from Bayer under the trademark Desmodur L), the adduct of 1 molecule of trimethylol propane to 3 molecules of isophorone diisocyanate, compounds such as 1,3,5-triisocyanatobenzene and 2,4,6-triisocyanatotoluene, and the adduct of 1 molecule of pentaerythritol to 4 molecules of toluene diisocyanate. Preferably, an aliphatic or cycloaliphatic di- or triisocyanate having 8–36 carbon atoms or an isocyanurate of the diisocyanates mentioned above is employed.

Di- or polyisocyanates having a higher molecular weight can be obtained by reacting a lower-molecular weight polyisocyanate with a hydroxyfunctional or aminofunctional compound. Suitable aminofunctional compounds include aliphatic or cycloaliphatic amines having at least 1, and preferably 2 to 4, primary amino groups. Examples of suitable amino compounds include ethylene diamine, propylene diamine, ethanolamine, propanolamine, butylene diamine, pentamethylene diamine, hexamethylene diamine, decamethylene diamine, 4,7-dioxadecane-1, 10-diamine, dodecamethylene diamine, 4,9-dioxadodecane-1,12-diamine, 7-methyl4,10-dioxatridecane-1 ,1 3-diamine, 1 ,2-diaminocyclohexane, 1,4-diaminocyclohexane, 4,4'-diaminocyclohexyl methane, isophorone diamine, bis-(3-methyl4-aminocyclohexyl)methane, 2,2-bis-(4-aminocyclohexyl)propane, nitrile tri(ethane amine), polyether polyamines, e.g., those known under the trademark Jeffamine® ex Huntsman, bis-(3-aminopropyl) methylamine, 3-amino-1 -(methylamino)propane, 3-amino-1-(cyclohexylamino)propane, N-(2-hydroxyethyl)ethylene diamine, and polyamines of the formula $H_2N$-$(R_2$-NH)n-$R_1$-$NH_2$, wherein the group $R_1$ and the n groups $R_2$, which may be the same or different, represent an alkylene group having 2–6, preferably 2–4, carbon atoms, and n is a number of 1–6, preferably 1–3. In this connection alkylene group also stands for a cycloalkylene group or an alkylene group having an ether-oxygen atom. Typical polyalkylene polyamines include diethylene triamine, dipropylene triamine, and dibutylene triamine. The amino compound preferably has a cycloaliphatic nature and possesses 5–15 carbon atoms, such as isophorone diamine, 4,4'-dicyclohexyl methane diamine, and 3,3'-dimethyl4,4'-dicyclohexyl methane diamine.

Suitable hydroxyfunctional compounds include aliphatic or cycloaliphatic polyols having at least 1, preferably 2 to 4, hydroxyl groups. Examples of suitable hydrgxyl compounds include ethylene glycol, propylene glycol, diethylene glycol, tetramethylene diol, neopentyl glycol, hexamethylene diol, cyclohexane diol, bis-(4-hydroxycyclohexyl)methane, glycerol, trimethylol ethane, trimethylol propane, tri(2-hydroxyethyl)isocyanurate, and pentaerythritol. Suitable hydroxyfunctional polyols and other suitable hydroxyl compounds, such as polyester diols and polyester polyols and polyether diols and polyether polyols, have been disclosed, int. al., in H. Wagner and H. F. Sarx, *Lackkunstharze,* 5th ed. (München: Carl Hanser Verlag, 1971). Suitable hydroxyfunctional polyesters have a hydroxyl number of from 5 to 200 mg KOH/g, an acid number <10 mg KOH/g, and an average functionality of at least 2. The polyesters can be crystalline, but amorphous polyesters are preferred. Mixtures of amorphous and crystalline polyesters also qualify for use. They can be obtained in the conventional way, by esterification or transesterification, optionally in the presence of a catalyst, such as dibutyl tin oxide or tetrabutyl titanate, polycarboxylic acids, such as adipic acid, sebacic acid, phthalic acid, isophthalic acid, terephthalic acid, pyromellitic acid, trimellitic acid, 3,6-dichlorophthalic acid, tetrachlorophthalic acid, or their anhydrides or ester forming equivalents with aliphatic diols, such as ethylene glycol, propane-1,2-diol, butane-1,2-dioli butane-1,4-diol, butane-1,3-diol, 2,2-dimethylpropane diol-1,3 (neopentylglycol), hexane-2,5-diol, hexane-1,6-diol, 1,4-dimethylol cyclohexane, 2,2-[bis-(4-hydrocyclohexyl)]-propane, diethylene glycol, dipropylene glycol, and 2,2-bis-[4-(2-hydroxyethoxy)]-phenyl propane, as well as smaller quantities of polyols, such as glycerol, hexane triol, sorbitol, pentaerythritol, trimethylol propane, and tri(2-hydroxyethyl)isocyanurate. In addition, fatty acids from linseed oil and soybean oil can be included.

Suitable polyurethanes are derived from one or more of the aforementioned aliphatic, cycloaliphatic or aromatic di-, tri- or tetraisocyanates which may be ethylenically unsaturated or not and from one or more of the aforementioned hydroxyl compounds. The preparation of polyolurethanes having isocyanate terminated groups generally proceeds as follows. The molar equivalency ratio of the number of hydroxyl groups to the number of isocyanate groups is usually selected in the range of 0.1:1 to 2:1 at a reaction temperature of from 30° to 200° C., preferably of from 600 to 150° C., and a reaction time between 5 minutes and 10 hours, preferably between 30 minutes and 5 hours. The reaction is commonly carried out in the presence of a solvent such as xylene, toluene, tetrahydrofuran, and butyl acetate. The preparation of the cross-linking agent by reacting the hydroxycyclocarbonate with the polyisocyanate proceeds analogously. If so desired, the hydroxyl group of the hydroxycyclocarbonate can be replaced by other reactive groups such as halogen (chlorine, bromine, iodine), tosylate or certain sulphonate esters. Substituting one reactive group, e.g., a chloride, for another opens up the possibility of a reaction being entered into with a group other than-one reactive towards a hydroxyl group. As an example may be mentioned the reaction of a chloride-functional cyclocarbonate with a compound containing phenolic hydroxyl groups such as present in, e.g., hydroquinone or bisphenol A.

The cross-linking agents used in powder coating compositions according to the invention can also be obtained by transesterifying a polyalkyl ester with a hydroxyfunctional cyclocarbonate. Suitable polyalkyl esters can be obtained by the nucleophilic addition of carbanions to α,β-unsaturated carbonyl compounds. Also suitable are alkyl ester terminated polyesters derived from any one of the aforementioned polycarboxylic acids, polyols, and/or ester forming equivalents thereof. A further example to be mentioned is the conversion of diethyl fumarate and diethyl malonate into the tetraethyl ester of 1,1,2,3-propane tetracarboxylic acid. Transesterification with a hydroxyfunctional cyclocarbonate will then give a cyclocarbonate-functional cross-linking agent.

Alternatively, a cyclocarbonate-functional cross-linking agent can be obtained by transetherification of a hydroxyfunctional cyclocarbonate with aminoformaldehyde groups-containing compounds, e.g., a urea resin or melamine resin.

A wide range of polymers reacting with epoxy to form ether forming or ester forming groups qualify for use in the thermosetting powder coating compositions according to the invention. Suitable polymers can contain, int. al., carboxyl, epoxy, oxetane, hydroxyl, carboxylic anhydride, phosphoric acid, phosphorous acid, and/or thiol groups. Preference is given in this connection to polyriers having free hydroxyl, carboxylic anhydride, oxetane, or carboxyl groups. The polymer in that case can be a polyester, a polyether, a polyurethane or a polycarbonate, with preference being given to polyesters and polyurethanes.

The number average molecular weight (Mn) generally is in the range of 800 to 10 000, preferably in the range of 1500 to 7000. At such a molecular weight the flow range generally is between 100° and 200° C. The glass transition temperature is commonly selected in the range of 200 to 120° C., but usually is higher than 30° C., preferably higher than 60° C.

Suitable carboxyl-functional polyesters have an acid number of from 5 to 100 mg KOH/g, a glass transition temperature between 300 and 90° C., and a hydroxyl number in the range of 0 to 10 mg KOH/g. The carboxyl-functional polyesters can be obtained in the conventional manner by converting an essentially aromatic polycarboxylic acid or ester forming equivalent thereof with an aliphatic or cycloaliphatic diol or ester forming equivalent thereof.

Examples of suitable aromatic polycarboxylic acids are phthalic acid, isophthalic acid, terephthalic acid, pyromellitic acid, trimellitic acid, 3,6-dichlorophthalic acid, and tetrachlorophthalic acid. Preference is given in this case to a polyester 50, preferably 70, mole % of the acid component of which is made up of isophthalic acid and/or terephthalic acid. In addition, other polycarboxylic acids can be present, such as tetrahydrophthalic acid, hexahydrophthalic acid, malonic acid, hexahydroendomethylene tetrahydrophthalic acid, azelaic acid, sebacic acid, decanedicarboxylic acid, dimeric fatty acid, adipic acid, succinic acid, and maleic acid in an amount of not more than 30, preferably 20, mole % of the overall amount of carboxylic acid. Hydroxyfarboxylic acids and/or lactones can also be incorporated into the polyesters. As examples may be mentioned 12-hydroxystearic acid, $\epsilon$-caprolactone, and the hydroxypivalic acid ester of neopentyl glycol. In addition, small quantities of a monocarboxylic acid may be present, such as benzoic acid, tert, butyl benzoic acid, hexahydrobenzoic acid, and saturated aliphatic monocarboxylic acids.

The diol component is essentially made up of aliphatic diols such as ethylene glycol, propane-1,2-diol, propane-1,3-diol, butane-1,2-diol, butane-1,4-diol, butane-1,3-diol, 2,2-dimethyl propane diol-1,3 (neopentyl glycol), hexane-2,5-diol, hexane-1,6-diol, diethylene glycol, 2,2-[bis(4-hydrocyclohexyl)]propane, 1,4-dimethylol cyclohexane, dipropylene glycol, and 2,2-bis[4-(2-hydroxyethoxy)] phenyl propane, as well as, optionally, small quantities of polyols having a functionality >2, such as glycerol, hexane triol, pentaerythritol, sorbitol, trimethylol propane, and tri (2-hydroxyethyl)isocyanurate. Instead of polyols, it is possible to employ epoxy compounds. The alcohol component preferably contains at least 50 mole % of neopentyl glycol. Also, compounds containing amino groups can be incorporated into the polyesters. As examples may be mentioned hexane-1,6-diamine, butane-1,4-diamine, and $\epsilon$-caprolactam. The amino group-containing compound can replace at least part of the polyols. The amide groups-containing polyester obtained in this manner has an increased Tg and powder coating compositions containing said polyester have improved spraying properties.

After preparation of the carboxyl-functional polyester at a temperature of about 240° C. and cooling to a temperature of about 190–200° C. it is possible to add a curing catalyst, which may be in the form of a masterbatch optionally including other additives, or not. Alternatively, the catalyst can be added as the polyesteris mixed with the cross-linking agent in an extruder, simultaneously with pigments and fillers.

The catalysts which qualify according to the invention for ring opening the epoxy groups formed from the cyclocarbonate groups are identical with those used for curing epoxyfunctional resins with acid, epoxy-epoxy, and epoxy with anhydride. They commonly contain tertiary amino groups, basic nucleophilic groups, and quaternary ammonium salts.

Examples of suitable classes of catalysts are N-dialkylamine pyridines, tertiary amines, imidazole derivatives, guanidines, and cyclic amino compounds. If so desired, the catalysts can be blocked. Specific examples of suitable catalysts are N-dimethylaminopyridine, benzotriazole, triethylamine, triphenyl amine, 4,5-diphenyl imidazole, 1-ethyl imidazole, 2-methyl imidazole, 4-methyl imidazole, tetramethyl guanidine, 1,5-diazabicyclo[4,3,0,] non-5-ene, and 1,5,7-triazabicyclo[4,4,0]dec-5-ene. The same compounds which qualify for use as cyclocarbonate group ring openers can be employed as quaternary ammonium salts.

For reacting the epoxy groups formed from the cyclocarbonate groups with a carboxylic anhydride use can be made of a nitrogenous catalyst of the aforementioned type. For reacting the epoxy groups formed from the cyclocarbonate groups with compounds having a hydroxyl functionality a strong Lewis acid can be employed. In addition, an extra curing agent can be used, e.g., a. carboxylic anhydride. For reacting one epoxy group formed from a cyclocarbonate group with another epoxy group so formed use can be made of a strong Lewis acid, with an additional curing agent usually providing superior results. The curing agents which can be used in addition to the cyclocarbonate groups-containing curing agents belong to the-group of polyanhydrides, hydrazides, and/or polyphenols. The amount of catalyst generally ranges from 0.01 to 10 wt. %, preferably from 0.1 to 5 wt. %, calculated on the amount of binder.

Of course, the present powder coating compositions may also contain the usual pigments, fillers, levelling agents, and stabilisers. Suitable pigments include inorganic pigments such as titanium dioxide, zinc sulphide, iron oxide, and chromium oxide, as well as organic pigments such as azo compounds. Examples of suitable fillers are metal oxides, silicates, carbonates, and sulphates.

Further, the powder coating compositions can include stabilisers, such as primary and secondary anti-oxidants, and UV-stabilisers, such as quinones, sterically hindered phenols, phosphonites, phosphites, thio-ethers, and HALS compounds. To obtain powder coatings of proper stability during curing, primary anti-oxidants are added in an amount corresponding to 0.1 to 2 wt. % of the binder composition. Examples of degassing media suitable for use are benzoin and cyclohexane dimethanol dibenzoate. Examples of levelling agents are polyalkyl acrylates, fluorocarbon compounds, and silicone oil. Other additives comprise those used to optimise spraying conditions, such as sterically hindered tertiary amines. The carboxyl-functional binder can be mixed with the cyclocarbonate groups-containing cross-linking agent, the pigments, and other additives in an extruder at a temperature in the range of 90° to 130° C. and cured after electrostatic deposition at a temperature in the range of 140° to 250° C. under the influence of the conventional catalyst. During the curing process the powder will melt and then flow across the substrate to be coated to form an even, connected film.

The powder coating compositions according to the invention can be applied either in the dry state or from an aqueous dispersion onto a wide range of substrates, such as synthetic materials, wood, metal, and glass. The invention will be further elucidated with reference to the following examples, which, of course, are submitted for a better understanding of the invention and are not to be construed as limiting in any manner whatsoever.

Example I

Preparation of tris(2-oxo-1 3-dioxolanyl-4-methyl) isocyanurate (TGIC-carbonate)

Into a 3-liter autoclave equipped with a stirrer, a gas inlet and outlet, a heating jacket, and a thermocouple were charged 500 g of triglycidyl isocyanurate (TGIC) (Araldit PT810, ex Ciba Geigy), 1500 g of N,N-dimethyl formamide (DMF), and 5 g of tetrabutyl ammonium iodide. The mixture was heated, with stirring, to 50° C. in 2 hours, with a homogeneous reaction mixture being formed. Next, the autoclave was flushed with carbon dioxide, after which the mixture was heated to 120° C. and the $CO_2$ pressure increased to 10 bar. The autoclave was kept in these conditions for 6 hours, until there was no further $CO_2$ uptake. After cooling to room temperature and relieving of the pressure the homogeneous liquid reaction mixture was transferred to a round-bottomed flask, after which ¾ of the DMF was removed under reduced pressure. The remaining liquid was precipitated by being poured into a vigorously stirred 3-liter aqueous solution. Following filtration the pale yellow liquid was washed with hot water and then dried in vacuo. The resulting white powder (TGIC-arbonate) had the following properties:

Epoxide number: 1.5 mg KOH/g

Melting range: 229–239° C.

Infra-red analysis: cyclocarbonate signal at 1810 1/cm.

Example II

Preparation of a powder coating composition based on a carboxyl-functional polyester and the cross-linking agent of Example I In an extruder 498 g of a polyester having carboxyl terminated groups (Uralac P2220 ex DSM Resins) with an acid number of 52 mg KOH/g, 102 g of the cross-linking agent of Example I, and 30 g of ethyl triphenyl phosphonium bromide were mixed at 110° C. with 7 g of levelling agent (Resiflow PV 88 ex Worlée) and 5 g of benzoin. After cooling the extrudate was pulverised and sieved on a sieve having a mesh size of 80 µm. The Tg of the powder was 55° C. The powder was cured for 10 minutes at 200° C., with an even coating layer being obtained.

Example III

Preparation of a cross-linking agent based on clycerol carbonate and an isocyanate-containing compound A mixture made up of 366 g (1,5 molar equivalents) of the trimer of isophorone diisocyanate (Vestanat® IPDI-TI 8901/100%, ex Hüls), 225 g of butyl acetate, and 0.75 g of dibutyl tin dilaurate was heated to 70° C. Next, 177.2 g (1.5 molar equivalents) of glycerol carbonate (ex Huntsman) were added dropwise to the reaction mixture over a period of 1. hour. The temperature was then kept at 70° C. for a further hour. After 1 hour infra-red spectroscopy failed to show any further isocyanate. The organic solvent was distilled off under reduced pressure. The product was a clear solid which melted at about 130–135° C.

Example IV

Preparation of a carboxyl-functional polyester

In a 2-liter reaction vessel equipped with a stirrer, a thermometer, and a distilling unit were charged 800 g (9,6 molar equivalents) of terephthalic acid, 534 g (10,2 molar equivalents) of neopentyl glycol, 16 g (0,36 molar equivalent) of trimethylol propane, and 1,5 g of dibutyl tin oxide. With stirring and passing of nitrogen the temperature was slowly raised to 240° C., with water being discharged. The reaction was continued until the polyester had an acid number <10 mg KOH/g. Next, in a second step, 150 g (1,8 molar equivalents) of isophthalic acid were added, after which the esterification process was continued until a polymer having an acid number of 40 mg KOH/g was obtained. The resulting resin had the following properties:

acid number 39,5 mg KOH/g functionality 2,25

Tg 69° C.

Example V

Preparation of a powder coating composition based on the carboxyl-functional polyester of Example IV and the cross-linking agent according to Example III In an extruder 480 g of the polyester having carboxyl terminated groups of Example IV, 120 g of the cross-linking agent according to Example III, and 24 g of ethyl triphenyl phosphonium bromide were mixed at 110° C. with 7 g of polyacrylate as levelling agent (Resiflow PV 88 ex Worlée) and 5 g of benzoin. After cooling the extrudate was pulverised and sieved on a sieve having a mesh size of 80 µm. The Tg of the powder was 60° C. The powder was cured for 10 minutes at 200° C., with an even, 55 µm thick coating being obtained. The impact strength of this coating was determined in accordance with ASTM D 2794-93 and found to be in excess of 80 kg.cm.

Example VI

Preparation of a powder coating composition based on a carboxyl-functional polyester, a cross-linking agent-containing epoxy groups, and a cross-linking agent containing cyclocarbonate groups In an extruder 577 g of a polyester containing carboxyl groups (Crylcoat 801 ex UCB) having an acid number of 32 mg KOH/g, 47 g of a cross-linking agent containing epoxy groups (Araldite PT910 ex Ciba Geigy), 21 g of the cross-linking agent of Example I, and 24 g of a catalyst masterbatch (Crylcoat 164 ex UCB) were mixed at 110° C. with 10 g of benzoin, 8 g of levelling agent (Resiflow PV88 ex Worlée), and 287 g pigment, type Kronos 2310. After cooling the extrudate was pulverised and sieved on a sieve having a mesh size of 80 µm. The Tg of the powder was 54° C. The powder was cured at 200° C. for 10 minutes. The impact strength of the cured coating determined in accordance with ASTM 02794-93 was in excess of 80 kg.cm. Obtained was an even coating without surface defects.

Example VII

Mutagenesis test

In the example below the mutagenicity of a cross-linking agent based on cyclocarbonate is compared with the mutagenicity of TGIC. The following guidelines were adhered to in the comparison:

Organisation for Economic Co-operation and Development (OECD), directive 471: "Genetic Toxicology: Salmornella typhimurium Reverse Mutation Assay," (adopted May 26, 1983), European Economic Community (EEC), Directive 92/69/EEC. Annex V of the EEC Directive 67/548/EEC, Part B: Methods for the Determination of Toxicity; B.14: "Other Effects-Mutagenicity: Salmonella typhimurium-Reverse Mutation Assay." EEC Publication no. L383 (adopted December 1992).

Studies of a certain type of Salmonella carried out in accordance with these guidelines clearly showed that, unlike TGIC, the cross-linking agent of Example I does not have any mutagenic properties.

What is claimed is:

1. A thermosetting powder coating composition comprising a mixture of particles reactive towards one another and a catalyst, with a portion of the reactive particles comprising a polymer and an epoxy the polymer reacting with the epoxy to form ester forming and/or ether forming groups, while another portion of the reactive particles comprises an at least bifunctional cross-linking agent which contains 2-oxo-1,3-dioxolan-4-yl groups, hereinafter referred to as cyclocarbonate groups, and, optionally, functional groups that are made up almost exclusively of epoxy groups, wherein both the polymer reacting with epoxy to form ester forming and/or ether forming groups and the cross-linking agent are obtained by a non-vinylic addition and/or polymerisation process.

2. A powder coating composition according to claim 1, wherein the catalyst used as ring opener for the cyclocarbonate group is present in a quantity of 0.1 to 5 parts by weight per 100 parts by weight of the mixture of particles reactive towards one another.

3. A powder coating composition according to claim 1, wherein the quantity of epoxy oxygen present in the cross-linking agent after $CO_2$ unblocking is at least 0.4 wt. %.

4. A powder coating composition according to claim 1, wherein the cyclocarbonate groups-containing cross-linking agent is obtained by reacting a corresponding polyepoxide with carbon dioxide.

5. A powder coating composition according to claim 1, wherein the cyclocarbonate groups-containing cross-linking agent is tris(2-oxo-1,3-dioxolanyl4-methyl)isocyanurate, which is obtained by reacting triglycidyl isocyanurate with carbon dioxide.

6. A powder coating composition according to claim 1, wherein the cyclocarbonate groups-containing cross-linking agent is obtained by reacting a cyclocarbonate containing a functional group with at least two groups reactive towards said functional group..

7. A powder coating composition according to claim 6, wherein the cyclocarbonate groups-containing cross-linking agent is obtained by reacting an HO-group-containing cyclocarbonate with a polyisocyanate.

8. A powder coating composition according to claim 7, wherein the polyisocyanate is the reaction product of a hydroxyfunctional compound and a low-molecular weight polyisocyanate.

9. A powder coating composition according to claim 1, wherein the polymer reacting with epoxy to form ester forming or ether forming groups comprises at least one functional group selected from the group consisting of carboxyl, acid anhydride and hydroxyl groups.

10. A powder coating composition according to claim 9, wherein the polymer reacting with epoxy to form ester forming or ether forming groups is selected from the group consisting of hydroxyl, carboxyl, and carboxylic anhydride-containing polyesters and polyurethanes.

11. A powder coating composition according to claim 1, wherein the glass transition temperature Tg of the polymer reacting with epoxy to form ester forming or ether forming groups is between 20° and 120° C.

12. A powder coating composition according to claim 10, wherein the polymer is a polyester having an acid number between 5 and 100 mg KOH/g, a hydroxyl number between 0 and 10 mg KOH/g, and a Tg between 30° and 90°C.

13. A powder coating composition according to claim 1, wherein the molecular weight. (Mn) of the polymer reacting with epoxy to form ester forming or ether forming groups is in the range of 800 to 10 000.

14. A powder coating composition according to claim 1, wherein the molecular weight (Mn) of the polymer reacting with epoxy to form ester forming or ether forming groups is in the range of 1500 to 7000.

15. A powder coating composition according to claim 1, wherein the molecular weight (Mn) of the cyclocarbonate groups-containing cross-linking agent is in the range of 200 to 7000.

16. A method comprising applying a powder coating composition in accordance with claim 1 onto a substrate by means of electrostatic spraying and curing at a temperature in the range of 140° C. to 250° C.

17. A method comprising applying a powder coating composition in accordance with claim 1 onto a substrate from an aqueous dispersion and curing at a temperature in the range of 140° C. to 250° C.

* * * * *